United States Patent
Kunishige

[19]
[11] Patent Number: 6,092,023
[45] Date of Patent: Jul. 18, 2000

[54] AUTOMATIC IMAGE DATA FILING SYSTEM USING ATTRIBUTE INFORMATION

[75] Inventor: Keiji Kunishige, Hachioji, Japan

[73] Assignee: Olympus Optical Co., Ltd., Tokyo, Japan

[21] Appl. No.: 08/757,130

[22] Filed: Dec. 3, 1996

[30] Foreign Application Priority Data

Dec. 13, 1995  [JP]  Japan .................................. 7-324570

[51] Int. Cl.[7] .................................................. H04N 5/225
[52] U.S. Cl. .............................. 702/1; 396/311; 382/305
[58] Field of Search ............................ 364/525; 386/125, 386/120, 128; 382/305; 702/1; 396/207, 210–211, 236, 297–300, 310, 311, 319; 707/200

[56] References Cited

U.S. PATENT DOCUMENTS

| | | | |
|---|---|---|---|
| 5,359,427 | 10/1994 | Sato ........................................ | 386/125 |
| 5,572,726 | 11/1996 | Hasuo ..................................... | 382/305 |
| 5,682,458 | 10/1997 | Funazaki ................................. | 386/128 |
| 5,701,529 | 12/1997 | Yokonuma et al. ..................... | 396/310 |
| 5,706,457 | 1/1998 | Dwyer et al. ........................... | 395/349 |
| 5,752,114 | 5/1998 | Saito et al. .............................. | 396/429 |
| 5,899,581 | 5/1999 | Kawamura et al. .................... | 386/120 |

FOREIGN PATENT DOCUMENTS

| | | |
|---|---|---|
| 2-257760 | 10/1990 | Japan . |
| 5-145838 | 6/1993 | Japan . |

*Primary Examiner*—Melanie A. Kemper
*Attorney, Agent, or Firm*—Frishauf, Holtz, Goodman, Langer & Chick, P.C.

[57] ABSTRACT

An electronic image filing system includes an information detecting/reading system having a film image data capture unit for capturing an image of a photographic film having developed, and a film information detection unit for detecting photographing information recorded in the photographic film in a photographing operation. The electronic image filing system further includes a film driving unit for performing a frame feed operation, a wind/rewind operation, and the like with respect to the film, and a film image data storage/accumulation unit for adding the photographing information detected by the film information detection unit as attribute information to the photographic image data read by the film image data capture unit and then accumulating the resultant data. The photographing information includes information about the photographing date and time and a film cartridge, the frame number information, and the like. The image data read on the basis of the attribute information are systematically stored and accumulated in the film image data storage/accumulation unit.

3 Claims, 11 Drawing Sheets

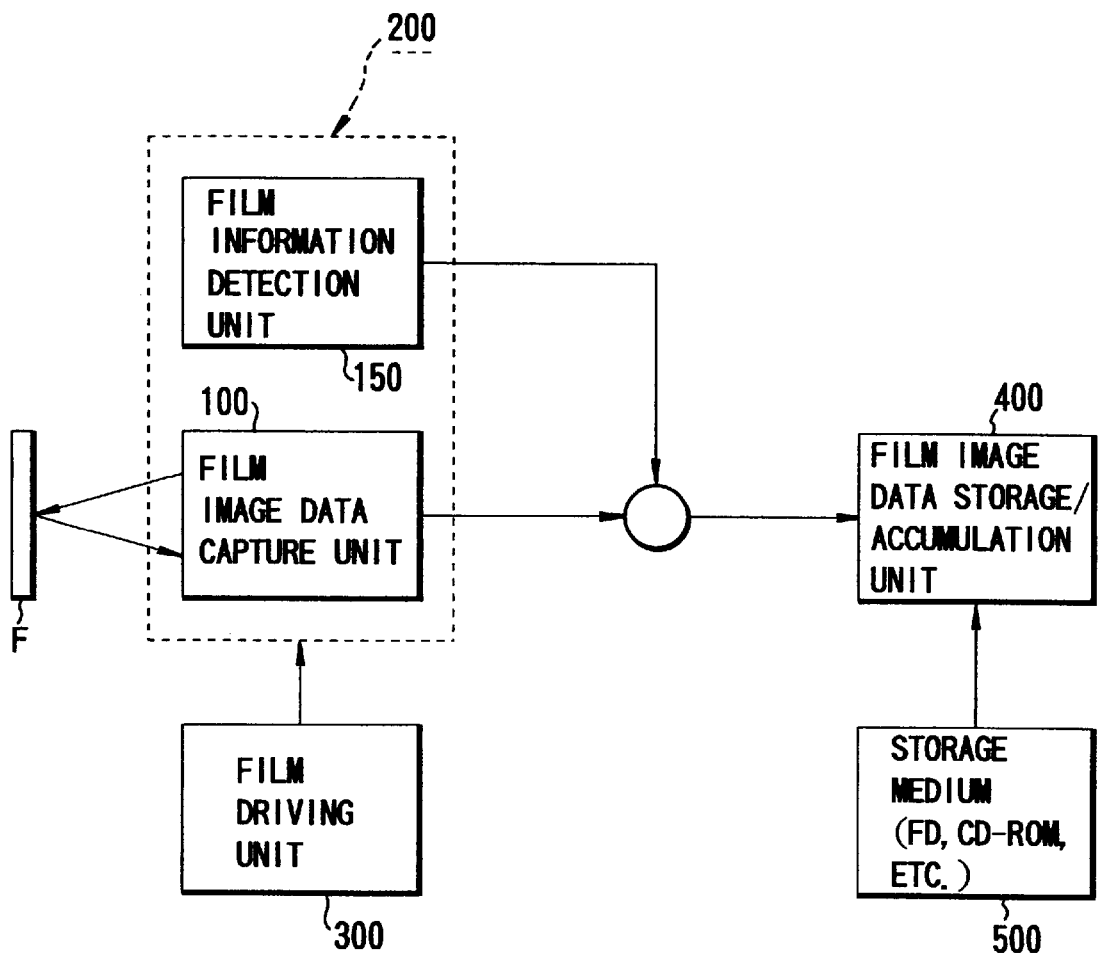
F I G. 1

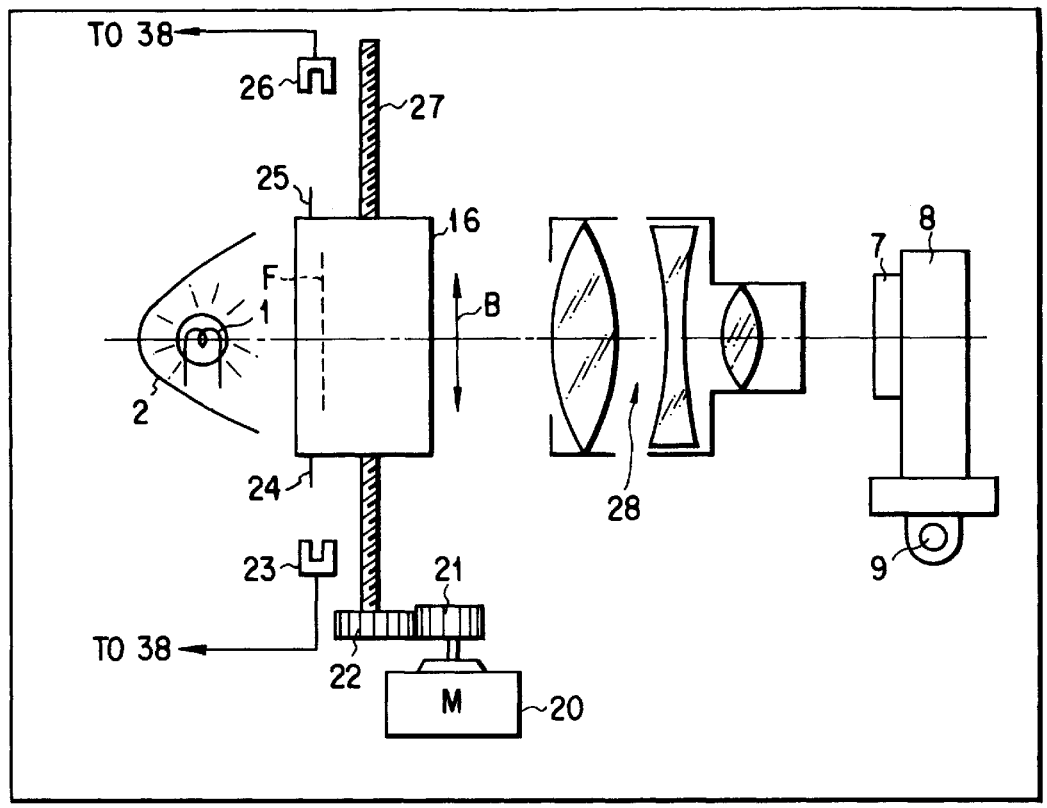
F I G. 3
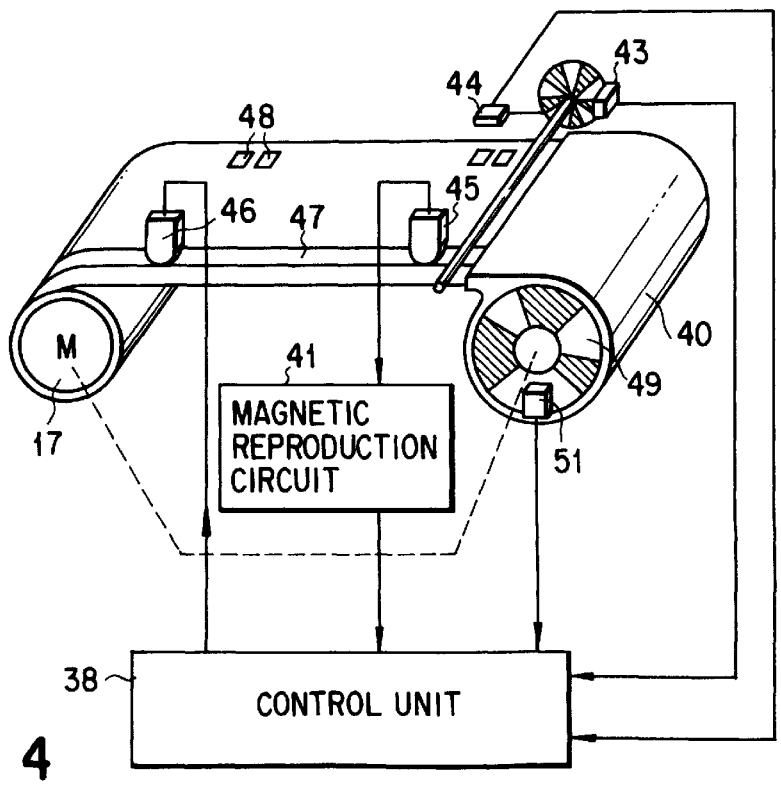
F I G. 4

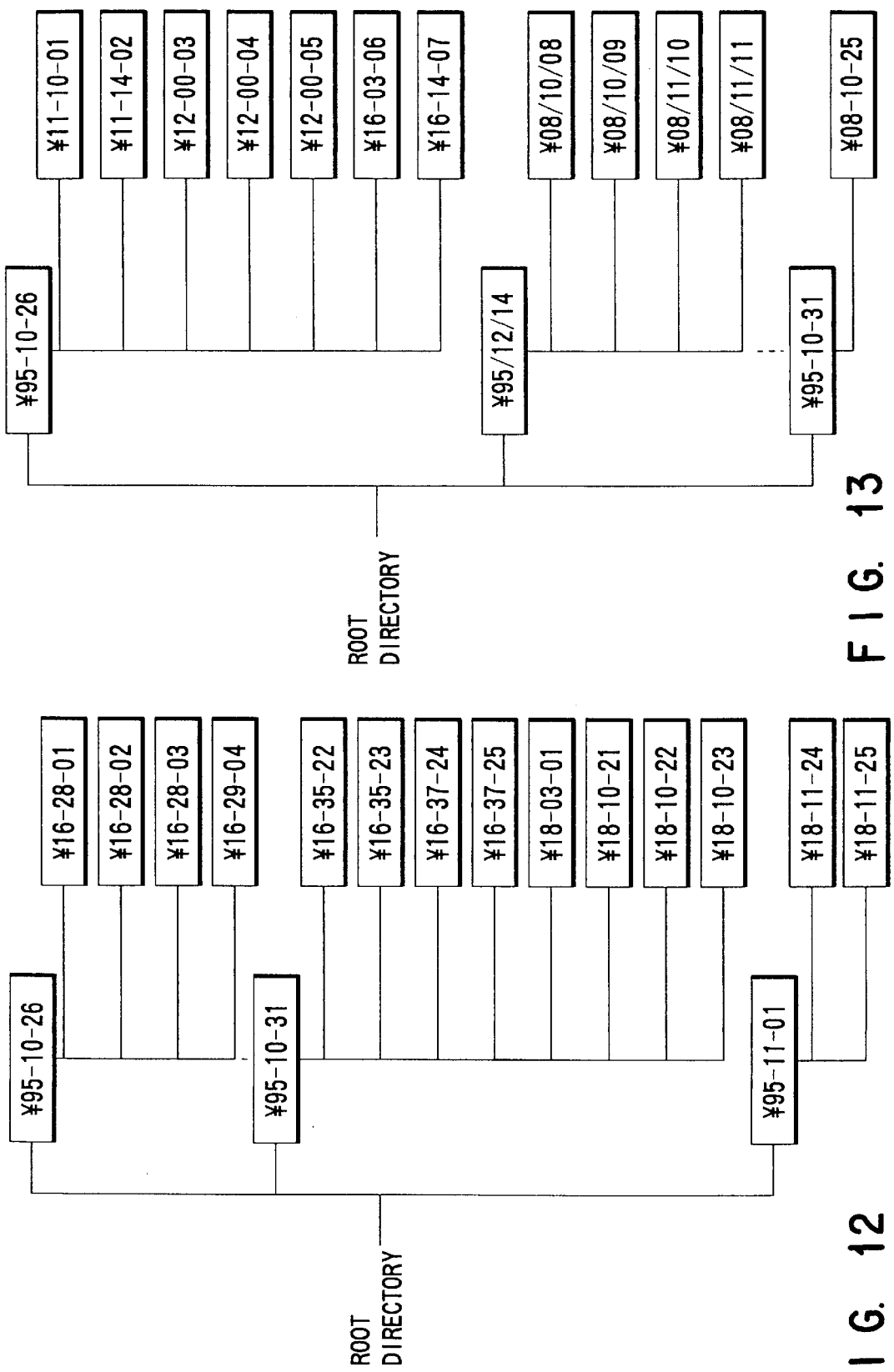
F I G. 13
F I G. 12

AUTOMATIC IMAGE DATA FILING SYSTEM USING ATTRIBUTE INFORMATION

BACKGROUND OF THE INVENTION

1. Field of the Invention

The present invention relates to an image filing system and, more particularly, to an electronic image filing system which automatically captures, e.g., image data of a film stored in a film cartridge using a scanner and which includes a film scanner for filing the image data using a computer.

2. Description of the Related Art

Conventionally, as a kind of image filing system, a so-called film scanner which has an automatic film feed function for automatically feeding film to an illumination unit in sequence in units of frames and which can electronically read a film image has widely been known.

For example, Jpn. Pat. Appln. KOKAI Publication No. 5-145838 discloses a film player which reproduces a film piece and a film stored in a cartridge.

Jpn. Pat. Appln. KOKAI Publication No. 2-257760 discloses an image reading apparatus. This image reading apparatus is constituted by a tray for storing a film, as a transparent original, held on a slide mount, an illumination unit arranged below the tray, and a reading unit having a charge-coupled device (CCD) line sensor for reading a film image fed to the illumination unit, and the like. In this image reading apparatus, films respectively stored in a plurality of storing portions provided to the tray are automatically fed one by one to the illumination unit by an automatic film feed function to continuously and electronically read the film image.

In the above-mentioned conventional image filing system, however, when the film image data electronically captured are stored and saved in an external storage device (e.g., a hard disk, an MO, a PD, a ZIP, or a CD-R), a file name must be designated for each captured image data, and the image filing system is not completely automatized.

Further, in an image filing system of this type, if the file name of the filed image file is not significantly related to the contents of the image file, the filing system suffers very poor operability and usability in subsequent file retrieval.

In addition, a CISC (Complexed Instruction Set Computer) type central processing unit (CPU) used in the conventional image filing system cannot input/output, by using the CPU ports, high-speed, complicated control signals such as a driving control signal for a CCD line sensor, and a control signal for controlling an interface circuit constituted by an amplifier for processing a read signal from the CCD line sensor, a clamping circuit, and an analog/digital (A/D) converter. At the same time, it is difficult for the CISC type central processing unit to execute output processing of a plurality of types of high-speed control signals for motor driver control of automatic frame feeding of a film and motor driver control of subscanning the CCD line sensor, and the like, data input processing, and further calculation processing of input data in a multi-task manner.

For this reason, in the conventional image filing system, it is a common practice that a dedicated control integrated circuit (IC) is provided to control the CCD line sensor, the interface circuit, and the motor driver, and the CISC type CPU performs each control described above via this IC.

As a result, in the conventional image filing system, the number of ICs to be mounted and the occupied area inevitably increase, which obstructs size and cost reductions of the whole system.

SUMMARY OF THE INVENTION

The present invention has been made in consideration of the above disadvantages, and has as its object to provide an image filing system which realizes size and cost reductions and includes a film scanner capable of automatically capturing and automatically filing a large number of film images.

It is another object of the present invention to provide a convenient image filing system with good operability such that, by filing an image file with a file name significantly related to the contents thereof, in subsequent file retrieval, the number of image files to be retrieved can be decreased to a certain degree or the contents of the film image can be predicted to some extent on the basis of the given file name.

According to the present invention, there is provided an electronic image file apparatus comprising: image capture means for capturing image data of a photographic film having developed; information reading means for reading photographing information recorded on the film in a photographing operation; and image data accumulation means for adding the photographing information read by the information reading means, as attribute information, to the image data of the film captured by the image capture means and then accumulating the image data.

According to the present invention, there is provided an electronic image file apparatus comprising: image data capture means for capturing image data of a film; information detection means for detecting photographing date information recorded on the film; and accumulation means for adding the photographing date information detected by the information detection means, as attribute information, to the image data captured by the image data capture means and then accumulating the data.

According to the present invention, there is provided a method of capturing and filing image data of a film in a computer system for executing processing of capturing and filing the image data, comprising the steps of: reading an image of a photographic film having developed; reading photographing information recorded on the photographic film in a photographing operation of the photographic film; and adding the read photographing information, as attribute information, to the read image of the photographic film and then accumulating the image.

According to the present invention, there is provided an article of manufacture, comprising a computer readable storage medium having computer readable program code means stored to execute processing of capturing and filing image data of a film, wherein the computer readable program code means comprises: first computer readable program means for causing a computer to read an image of a photographic film having developed; second computer readable program means for causing the computer to read photographing information recorded on the photographic film in a photographing operation of the photographic film; and third computer readable program means for causing the computer to add the photographing information read by the computer in accordance with the second computer readable program means as attribute information to the image of the photographic film read by the computer in accordance with the first computer readable program means, and then to accumulate the image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the conceptual structure of an image filing system according to the first embodiment of the present invention;

FIG. 3 is a side view showing the arrangement of the main part of the scanner device in the image filing system according to the second embodiment of the present invention;

FIG. 4 is a perspective view showing an arrangement around the cartridge folder of the scanner device in the image filing system according to the second embodiment of the present invention;

FIG. 12 is a view showing the directory structure of the fourth example of the captured image data filing by the image filing system of the present invention; and FIG. 13 is a view showing the directory structure of the fifth example of the captured image data filing by the image filing system of the present invention.

DETAILED DESCRIPTION OF THE PREFERRED EMBODIMENTS

Figure 2:
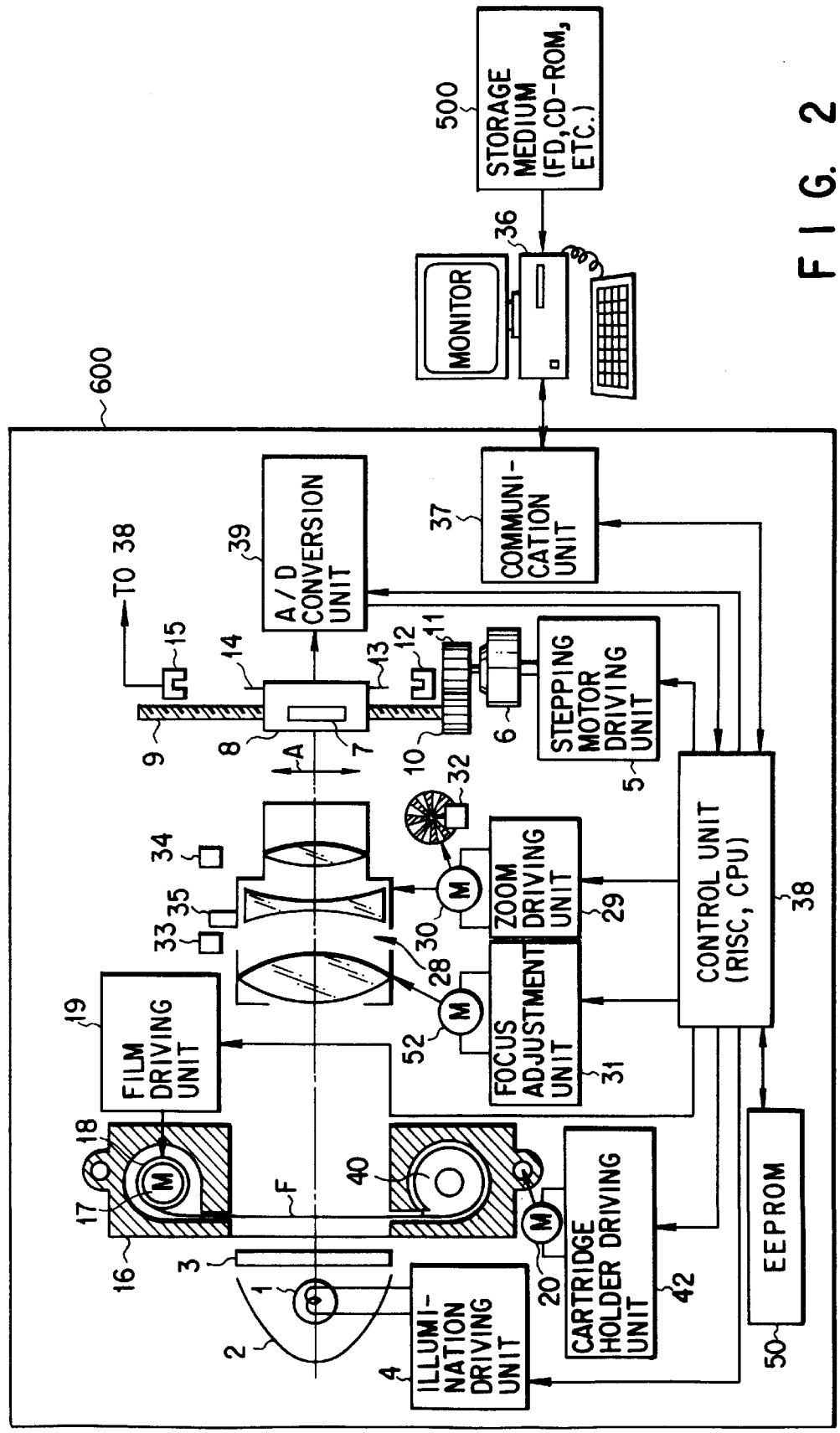
FIG. 2 is a plan view showing the arrangement of a scanner device in an image filing system according to the second embodiment of the present invention.

Reference will now be made in detail to the presently preferred embodiments of the invention as illustrated in the accompanying drawings, in which like reference characters designate like or corresponding parts throughout the several drawings.

An image filing system of the present invention will be described in detail below by exemplifying a plurality of embodiments with reference to the accompanying drawings.

(First Embodiment)

FIG. 1 is a block diagrams showing the conceptional arrangement of an image filing system according to the first embodiment of the present invention.

As shown in FIG. 1, the image filing system of the present invention includes the following functional block.

More specifically, this image filing system has an information detection read system 200 including a film image data capture unit 100 for electronically capturing an image of a photographic film F having developed and a film information detection unit 150 for detecting photographing information recorded on the photographic film F in a photographing operation, a film driving unit 300 for performing film feeding, wind/rewind driving, and the like with respect to the photographic film F, and a film image data storage/accumulation unit 400 for adding the photographing information read by the film information detection unit 150, as attribution information, to the image data of the photographic film F read by the film image data capture unit 100, and storing and accumulating the resultant data.

In this case, a storage medium 500, such as a floppy disk (FD) and a CD-ROM, loaded in the film image data storage/accumulation unit 400, which comprises a personal computer or the like, stores a series of computer readable programs including a predetermined processing procedure required for film image data storage/accumulation processing in the film image data storage/accumulation unit 400.

The above-mentioned photographing information recorded on the photographic film F in a photographing operation is, e.g., photographing date information or photographing time information.

In addition to the above information, information about a film cartridge storing the photographic film F, the film frame number information of the photographic film F, and the like may also be stored and accumulated in the film image data storage/accumulation unit 400 under systematic directory management.

Note that these pieces of photographing information are magnetically or optically written in a predetermined portion of the photographic film F or the film cartridge storing the photographic film F.

The film image data capture unit 100 reads the image data of the photographic film F with an optical image reading means.

The film information detection unit 150 detects information recorded at the leading end of the photographic film F or, e.g., a magnetic recording area of each frame with a magnetic head.

In this manner, image data in units of frames of the photographic film F upon a photographing operation are automatically captured in sequence by the film image data capture unit 100, and at the same time photographing information of a corresponding frame is detected by the film information detection unit 150. After adding the photographing information detected by the film information detection unit 150 as attribute information to the image data of the photographic film F captured by the film image data capture unit 100, the film image data storage/accumulation unit 400 automatically stores and accumulates the resultant image data.

More specifically, when the photographing information detected by the film information detection unit 150 is added as attribute information to the image data of the photographic film F captured by the film image data capture unit 100, and the resultant image data are automatically stored and accumulated, the film image data storage/accumulation unit 400 can give the recording unit image file a proper significant file name and file the image file in a predetermined directory.

In later retrieval, therefore, on the basis of only the given file name, the number of target image files can be limited to a certain degree, and the contents of a file image can be predicted to some extent.

In addition, the user can retrieve a desired image with good usability because the file can also be retrieved using a time stamp value (i.e., date and time) in the photographing operation as a sort key.

By filing an image file with a file name significantly related to its contents, the present invention can provide a convenient image filing system having good operability in later file retrieval such that the number of image files to be retrieved is decreased to a certain degree or the contents of a film image are predicted to some extent, and having good usability when the user retrieves a desired image.

(Second Embodiment)

FIGS. 2, 3, and 4 are views showing the second embodiment in which the image filing system according to the present invention is applied to a film scanner 600, as a detailed example.

FIG. 2 is a plan view of the film scanner 600, and FIG. 3 is a side view thereof.

FIG. 4 is a perspective view for explaining a film information detection unit around a cartridge holder 16 in FIG. 2.

The film scanner 600 as the embodiment of the present invention shown in FIG. 2 includes an illumination means for illuminating a file original.

As this illumination means, a light-emitting diode (LED), a fluorescent lamp (e.g., a thermionic cathode-ray tube or a cold cathode-ray tube), and the like can be used. In this embodiment, the entire surface of each frame of a film F is uniformly illuminated by a fluorescent lamp 1, a reflector 2, and a diffusion plate 3.

The fluorescent lamp 1 is inverter-driven by an illumination driving unit (an inverter circuit is used in this case) 4 at a frequency of about 100 kHz, and driven for illumination at a period sufficiently shorter than the integrated action time of a CCD line sensor 7 (to be described later).

A stepping motor driving unit 5 is a driving circuit for subscanning the film F as an original, and drives the CCD line sensor 7 with a stepping motor 6 via a CCD feed mechanism (to be described later) in the subscanning direction (vertical direction indicated by an arrow A in FIG. 2).

The CCD line sensor 7 itself is arranged along the main scanning direction perpendicular to the subscanning direction.

A one-frame image signal corresponding to one frame of the film F is obtained by the CCD line sensor 7 upon one subscanning operation by the CCD feed mechanism.

The CCD line sensor 7 is fixed to a line sensor carriage 8 which serves as a CCD feed mechanism, and the carriage 8 is threadably engaged with a feed screw 9, which is coupled to the stepping motor 6 by gears 10 and 11.

With this arrangement, subscanning of the CCD line sensor 7 is performed in correspondence with the rotation amount of the stepping motor 6.

The moving amount and position of the carriage 8 are obtained by a control unit 38 by counting the number of driving pulses of the stepping motor 6 in synchronism with output signals of start and end photointerrupters (PIs) 12 and 15.

The relative positions of the carriage 8, a lens system 28, and the cartridge holder 16 can be calculated on the basis of an adjustment value written in an EEPROM 50 and the number of driving pulses described above.

It can be detected whether the PIs 12 and 15 are in a light-shielded state by light-shielding members 13 and 14 attached to the carriage 8 or in a non-light-shielded state. When the PIs 12 and 15 are light-shielded, the control unit 38 inhibits driving of the stepping motor 6 in the direction (direction to set the PIs in the light-shielded state) via the stepping motor driving unit 5.

A film cartridge 40 in which the film F is wound is stored in the cartridge holder 16.

The film F in the film cartridge 40 is wound on a spool 18 by a film driving motor 17, which is called "wind" of the film F.

With this operation, a certain frame, of the film F, having an image to be captured by a scanner can be set.

The film driving motor 17 is controlled by a film driving unit 19 via the control unit 38 to wind and "rewind" the film F.

The driving amount of the film F is detected by small pulse outputs from a film perforation detection photoreflector (PR) and a film driven PI. On the basis of this driving amount, film driving control is performed by the control unit 38 via the film driving unit 19.

A detailed description of this film driving control will be described later with reference to FIG. 4.

The cartridge holder 16 is threadably engaged with a feed screw 27 shown in FIG. 3, which is coupled to a stepping motor 20 by gears 22 and 21.

With this mechanism, the frame of film F can be moved to a direction perpendicular to the subscanning direction.

The moving amount and position of the cartridge holder 16 are obtained by the control unit 38 by counting the number of driving pulses of the stepping motor 20 in synchronism with output signals from start and end PIs 23 and 26.

The relative position of the cartridge holder 16 with respect to the lens system 28 and an illumination optical system can be calculated by the control unit 38 on the basis of an adjustment value written in the EEPROM 50 and the number of driving pulses.

It can be detected whether the PIs 23 and 26 are in a light-shielded state due to light-shielding members 25 and 24 attached to the cartridge holder 16 or in a non-light-shielded state. When the PIs 23 and 26 are light-shielded, the control unit 38 inhibits driving of the stepping motor 20 in the direction (direction to set the PIs in the light-shielded state) via a cartridge holder driving unit 42.

With a combination of the subscanning driving by the CCD feed mechanism and the vertical driving by the cartridge holder 16, the film scanner 600 of this embodiment can enlarge a desired trimming frame area in one frame of the film F via the lens system 28 serving as a zoom optical system, and can capture the frame as image data with hardly decreasing the resolution, while effectively using the main scanning area of the CCD line sensor 7.

The frame of the film F is zoomed via the lens system 28 serving as the zoom optical system, and projected on the CCD line sensor 7.

The lens system 28 as the zoom optical system is driven by driving a zoom motor 30 by the control unit 38 via a zoom driving unit 29.

The zoom driving amount of the lens system 28 as the zoom optical system is set by a pulse output when a PI gear interlocked with the zoom motor 30 is rotated to set PIs 33 and 34 in the light-shielded or non-light-shielded state by a light-shielding plate 35 upon the rotation of the PI gear.

In this case, the zoom value of the lens system 28 as the zoom optical system can be obtained by the control unit 38 by counting the number of pulses of a PI 32 in synchronism with output signals from the start and end PIs 33 and 34.

The zoom value of the lens system 28 as the zoom optical system can be calculated by the control unit 38 on the basis of an adjustment value written in the EEPROM 50 and the number of driving pulses.

Focusing of the lens system 28 as the zoom optical system is performed by driving a focus motor 52 by the control unit 38 via a focus adjustment unit 31.

The zoom value of the lens system 28 as the zoom optical system, the setting value and subscanning driving amount of the cartridge holder 16, a main scanning capture pixel representing an effective frame data area, and a subscanning capture range are set by the user upon performing setting on the control window on a monitor using the keyboard of a PC (Personal Computer; to be described later).

The control unit 38 on the film scanner 600 side recognizes the user's setting values on the PC 36 side via a communication unit 37 and controls the whole film scanner 600 on the basis of the communicated data.

The control unit 38 controls transfer of digital image data obtained by processing an image signal from the CCD line sensor 7 by an A/D conversion unit 39, to the PC 36 via the communication unit 37.

Note that the control unit 38 comprises a RISC type microcomputer (CPU).

This RISC type microcomputer (CPU) is a so-called "Reduced Instruction Set Computer", which can execute one instruction at one clock of a clock oscillation frequency.

In contrast to this, a conventional CPU is called a CISC (i.e., "Complexed Instruction Set Computer"), which requires four clocks to execute one instruction even in a high-speed operation.

The conventional CISC type CPU cannot therefore input/output high-speed complicated control signals such as a driving control signal for the CCD line sensor and a control signal for controlling an interface circuit constituted by an amplifier, a clamping circuit, and an A/D converter, by utilizing the CPU ports.

Further, it is difficult for the conventional CISC type CPU to execute output processing of a plurality of types of high-speed control signals for motor driver control, CCD control, and the like, data input processing, and calculation processing of input data in a multi-task manner.

For this reason, it is a common practice in the conventional film scanner that a dedicated control IC for controlling the CCD line sensor, the interface IC, and the motor driver is arranged, and the CPU performs the respective control operations via this IC. As a result, the conventional film scanner requires a larger number of ICs to be mounted and a larger occupied area, which obstructs size and cost reductions of the film scanner.

The embodiment of the present invention is characterized in that the RISC type CPU is employed in consideration of the above problem.

The above control signals are directly assigned to the I/O ports of the RISC type CPU to eliminate the external circuit.

Consequently, according to the present invention, the number of components of the apparatus which constitute the system, and the total occupied area of the respective components are decreased, thereby realizing a compact film scanner at low cost.

For the above purpose, the RISC type microcomputer of this embodiment performs predetermined control while generating various signals (not shown) as follows.

That is, the various signals are mainly a stepping motor control signal, CCD control signals such as a read transfer pulse (ΦROG), a shift clock (ΦCLK), and a reset pulse (ΦRS), control signals STOP, LOAD, UP/DOWN, and CK to set the gate of the amplifier for amplifying an output from the CCD line sensor, a control signal CMP for clamping the output level immediately after resetting the output from the CCD line sensor, a control signal S/H for sampling/holding the output level, a control signal BCMP for clamping the black level of the output from the CCD line sensor, and an A/D conversion timing control signal. The signals also include a control signal for data communication with the PC 36, and the like. The respective control signals, which are generated at the same time, are produced and identified in a software manner.

The film scanner 600 is connected to the PC (Personal Computer) 36 via the bidirectional communication unit 37, and transmits captured image data to the PC 36 or captures a command from the PC 36 to perform a processing operation in accordance with the command request of the PC 36.

The PC 36 includes a main body, a monitor, and an input operation keyboard. Further, the PC 36 incorporates a central processing unit (CPU) and an internal storage device (e.g., a hard disk or a RAM). The CPU performs predetermined processing for executing a predetermined series of processing steps required for film image data storage/accumulation processing of the main body in accordance with a computer readable program code means for executing the predetermined series of processing steps required for the film image data storage/accumulation processing shown in a flow chart (to be described later) stored in the computer readable storage medium 500, such as an FD or a CD-ROM, loaded in the main body. Further, the CPU performs predetermined processing with respect to peripheral devices such as the film scanner 600, a printer, an external storage device, and the like. The internal storage temporarily stores data.

The film scanner 600 constituting the image filing system of the present invention, and the PC 36 may be connected using an SCSI, a PCI bus, an ISA bus, or the like. This embodiment however uses especially a printer port as a bidirectional communication means.

As a result, bidirectional communication is possible only by connecting the film scanner 600 and the PC 36 via a printer cable without using any special interface board.

In this system, therefore, the total system cost can be reduced, and the user easily connects the film scanner 600 and the PC 36 without any resource distribution setting work of the PC 36.

FIG. 4 is a partial perspective view showing an electronic unit around the cartridge holder 16 of the film scanner 600.

Information from the film cartridge 40 can be read by driving the stepping motor 20 by the cartridge holder driving unit 42 via the control unit 38 and adjusting the film cartridge 40 to a predetermined position.

More specifically, a circular data disk 49 is attached to the bottom portion of the film cartridge 40 in an interlocked manner with a film rotary shaft. The film F is rewound to rotate the data disk 49 and optically read its predetermined bar-code-shaped black-and-white pattern by a PR (Photo-Reflector) 51.

The data disk 49 records "the number of frames" of a film stored in the film cartridge 40, "negative-positive information", "ISO information", and other information about the film cartridge.

The film F has a magnetic track 47 formed in the longitudinal direction. While traveling the film F in a predetermined direction, information recorded on the magnetic track 47 is detected by a magnetic reproduction head 45 and transmitted to the control unit 38 via a magnetic reproduction circuit 41.

The control unit 38 recognizes the magnetic information and sends it to the PC (Personal Computer) 36 via the communication unit 37.

The PC 36 comprises a directly accessible storage medium such as a hard disk or a floppy disk serving as a film image data storage/accumulation means which can accumulate data sent from the film scanner 600 in accordance with a predetermined rule.

As the magnetic information, the maker recognition code of the film cartridge 40 is recorded on the tongue portion (i.e., lead portion) of the film F.

Each frame of the film F records the photographing date, the aspect ratio of the frame, the presence/absence of the use of the electronic flash, and other information, as photographing information upon using the film.

The control unit 38 not only recognizes the recorded information but also can write and record management information (i.e., the number of prints, caption designation, a film cartridge management code, and a film frame album editing control code) about the frame of the film F on the magnetic track 47 via a magnetic write head 46.

The read and write operations of the magnetic information are executed by the control unit 38 on the basis of timing signals from a PR 44 for detecting perforations 48 of the film F and a PI 43 for outputting a shorter pulse in response to the driving amount of the film F.

Next, the operation of an embodiment in which the image filing system of the present invention is applied to a film scanner will be described with reference to FIG. 5 to FIGS. 7A and 7B, and FIGS. 8A, 8B, 8C, and 8D.

FIG. 5 to FIGS. 7A to 7B are flow charts showing the operations of the film scanner 600 side and the PC 36 side which constitute the image filing system of this embodiment, respectively.

FIGS. 8A to 8D exemplify display operation changes on the monitor display screen of the PC 36 which constitutes the image filing system of this embodiment.

The operation of this embodiment according to the present invention will be described in detail below based on the reference numerals shown in FIGS. 2, 3, and 4 described above.

Figure 5:
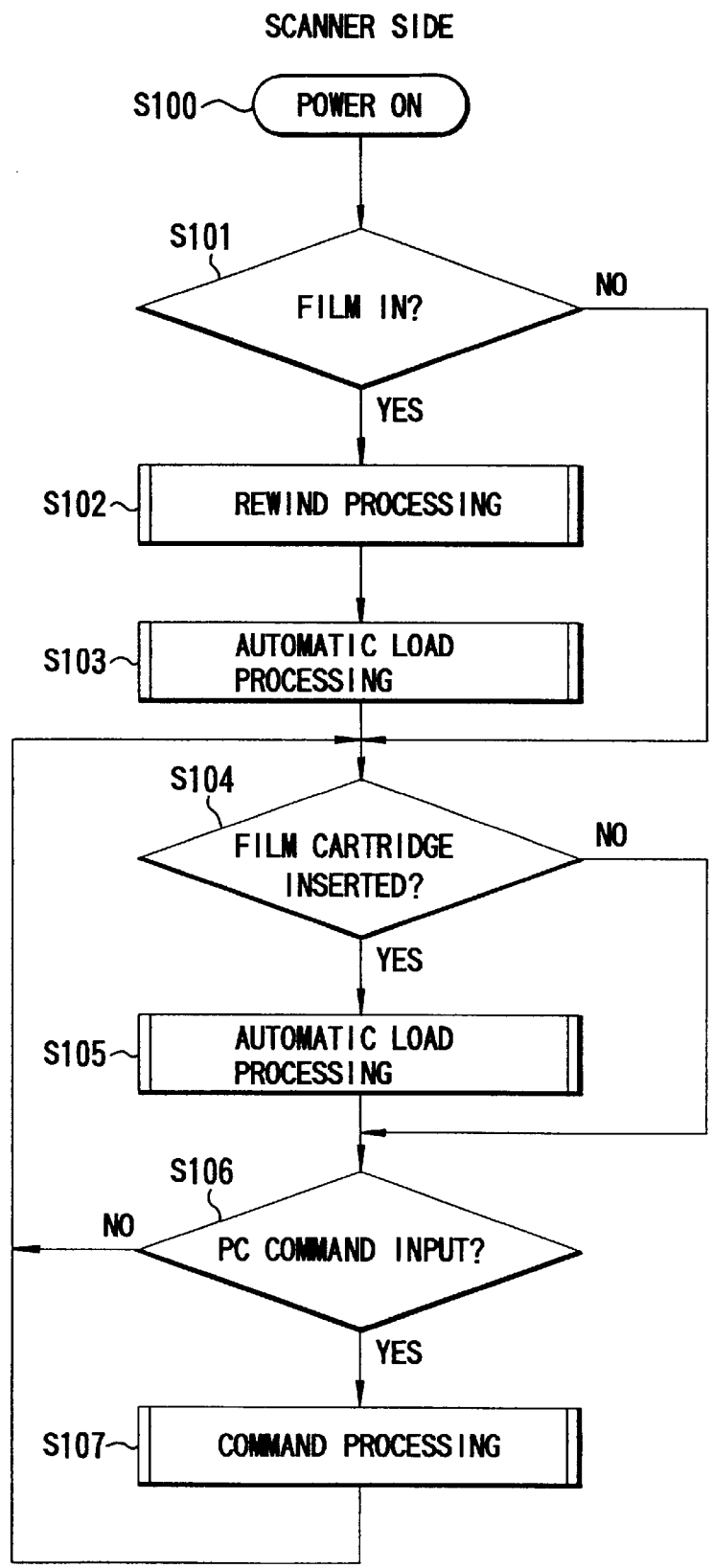
FIG. 5 is a main flow chart showing the operation of the scanner side in the image filing system according to the second embodiment of the present invention.

The flow chart in FIG. 5 represents the steps of a processing routine which is started when the film scanner 600 side is powered on.

When the film scanner 600 is powered on, the processing is started from step S100 (S101). First, when the film cartridge 40 shown in FIG. 2 is loaded in the cartridge holder 16, a switch (not shown) for detecting the presence/absence of the film cartridge 40 is turned on, the control unit 38 detects this change and advances to the next step S102.

On the other hand, if the film cartridge 40 cannot be detected, the control unit 38 shifts to step S104.

In step S102, when the film F comes out from the film cartridge 40, the control unit 38 performs "rewind processing" for storing the film F coming out in the film cartridge 40 by the film driving unit 19 (step S102).

Note that whether the film F comes out from the film cartridge 40 may be determined by calculation comparison based on information about the current film frame count information stored in the EEPROM 50.

In step S103, the control unit 38 continues the film rewind operation by the film driving unit 19 until the information of the data disk 49 is completely read via the PR (Photo-Reflector) 51.

The read data of the data disk 49 are temporarily stored in the storage means (internal RAM) of the control unit 38 in FIG. 2, and at the same time transferred to the PC 36 via the communication unit 37 (step S103).

After the information of the data disk 49 is completely read, while reading magnetic information recorded near the tongue portion of the film F via the magnetic reproduction circuit 41, the control unit 38 causes the film driving unit 19 to drive the film F to the first frame position and enable image data capture.

The control unit 38 checks whether the film cartridge 40 is inserted (step S104).

If the film cartridge 40 is inserted in this step for the first time, the control unit 38 performs "automatic load processing" (step S105).

On the other hand, if it is determined that no new film cartridge 40 is inserted, the control unit 38 shifts to step S106 to wait a predetermined command input.

That is, the control unit 38 detects whether a predetermined command is input from the PC 36 via the communication unit 37 (step S106).

If YES in step S106, the control unit 38 executes "command processing" corresponding to this command (step S107).

For example, assuming that an "image read command" to be described later is input, a command processing routine, shown in FIG. 6, for executing an operation of reading image information recorded on the film F from the first frame of the film F in units of frames is started.

Upon completion of the image capture processing of the frames, the control unit 38 returns to the processing of step S104 described above and repeats similar determination.

In contrast, if no predetermined command is input from the PC 36 in step S106, the control unit 38 returns to step S104, and the loop of checking whether the film cartridge 40 is inserted is repeated again to wait input of a predetermined command from the PC 36 or insertion of the film cartridge 40.

Figure 6:
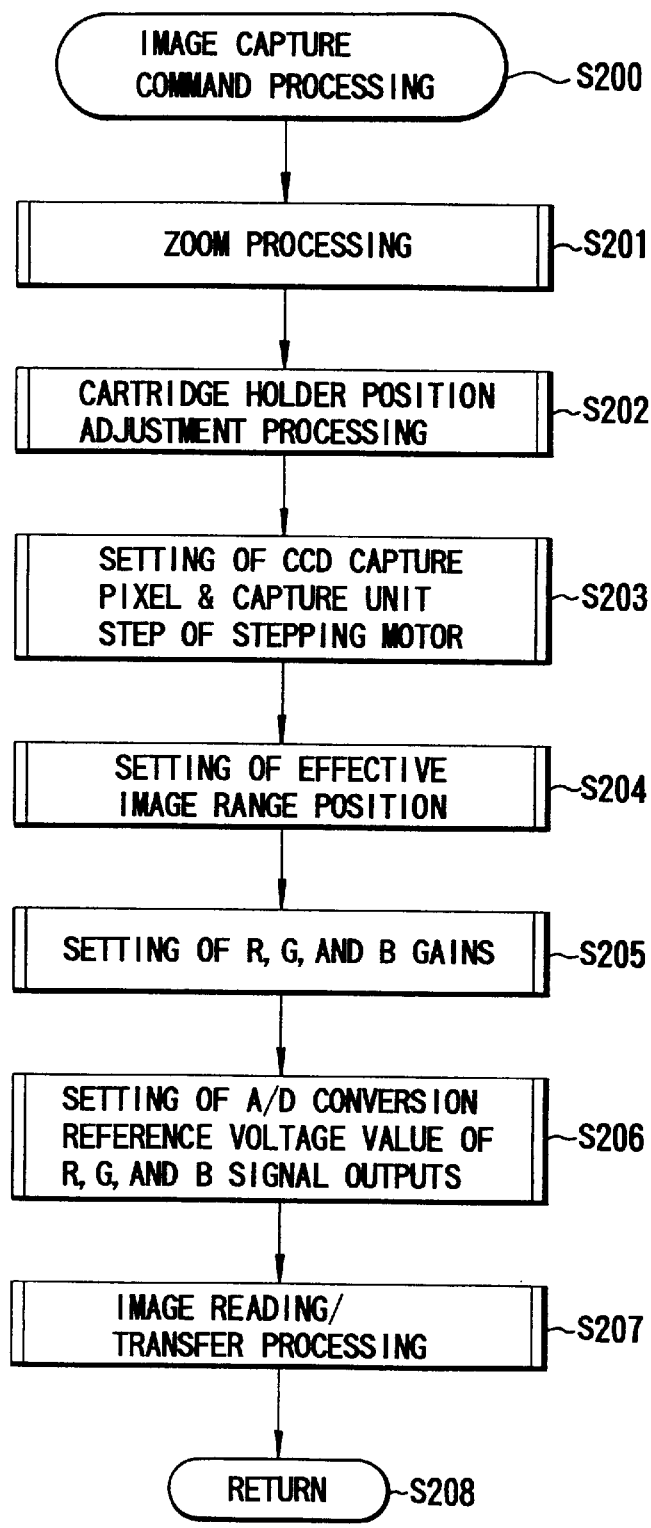
FIG. 6 is a flow chart showing the operation of image capture command processing on the scanner side in the image filing system according to the second embodiment of the present invention.

The flow chart in FIG. 6 shows the "image capture command processing routine" on the film scanner 600 side when the "image capture command" described above is sent from the PC 36.

More specifically, when the control unit 38 recognizes an image capture command transmitted to the film scanner 600 side in "transmission processing of an image capture command" in step S308 of FIG. 7A (to be described later), which processing is executed on the PC 36 side, the routine shown in FIG. 6 is called to execute a series of processing steps as follows (step S200).

In capturing an image, the control unit 38 first executes initial setting of a zoom value, as "zoom processing", on the basis of predetermined command data (i.e., each capture parameter preset value) added to the command designated by the PC 36 (step S201).

In this processing, the zoom value is initially set on a normal "wide" side.

In capturing the image, the control unit 38 executes position setting of the cartridge holder 16 on the basis of each capture parameter preset value of the command data designated by the PC 36 (step S202).

In this processing, the cartridge holder 16 is normally driven to adjust the position of the cartridge holder 16 such that the center of the frame of the film F matches with the optical axis of the illumination and photographing optical systems, as shown in FIG. 3.

Subsequently, in capturing the image, the control unit 38 executes setting of the capture pixel pitch of the CCD line sensor 7 and setting of the capture unit step of the stepping motor 6 on the basis of the command data (i.e., each capture parameter preset value) designated by the PC 36 (step S203).

In capturing the image, the control unit 38 executes setting of the capture effective image range on the basis of the command data (each capture parameter preset value) designated by the PC 36 (step S204).

More specifically, the capture pixel range of the CCD line sensor 7 in the main scanning direction and the capture range of the stepping motor 6 in the subscanning direction are set.

It is assumed that the entire frame of the film F is normally designated as the capture frame range.

In capturing the image, the control unit 38 executes setting of the optimum values of R, G, and B gains having set on the basis of maker information and the negative-positive information of the film F based on the command data (each capture parameter preset value) designated by the PC 36 (step S205).

In capturing the image, the control unit 38 executes setting of the optimum value of the reference voltage of the A/D converter for the R, G, and B gains having set on the basis of maker information and the negative-positive information of the command data (i.e., each capture parameter preset value) designated by the PC 36 (step S206).

With this setting, the optimum gamma characteristics and the optimum quantization can be realized in processing an image signal from the CCD line sensor 7.

Finally, the control unit 38 executes image capture processing on the basis of each setting described above (step S207).

More specifically, upon detecting a transmission enable signal supplied from the PC 36 via the communication unit 37, the control unit 38 drives the stepping motor 6 via the stepping motor driving unit 5 in units of predetermined steps to receive a one-line output from the CCD line sensor 7.

Then, the control unit 38 sequentially transmits the captured one-line image data to the PC 36 side via the communication unit 37.

The control unit 38 checks whether the current frame is the final frame of the film F, and if YES, advances to step S208 to end this processing routine and return to the former processing (step S208).

On the other hand, if the current frame is not the final frame, the control unit 38 may shift to the above-described processing in step S204 to repeatedly execute a similar series of processing steps.

Figure 7A:
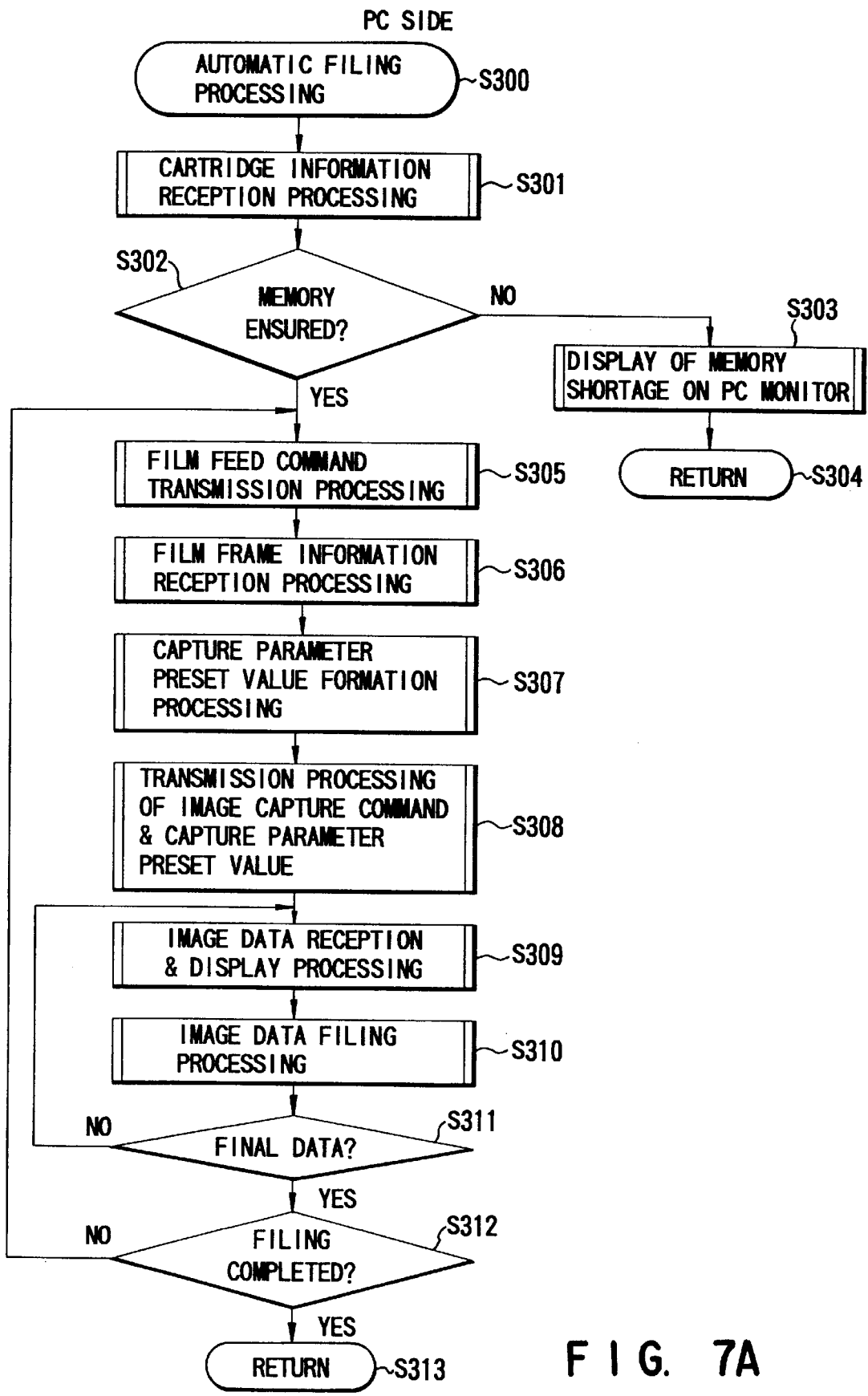
FIGS. 7A and 7B are flow charts respectively showing the operations of automatic filing processing on the PC side in the image filing system according to the second embodiment of the present invention.

The flow chart in FIG. 7A shows the procedure steps of "automatic filing processing" to be performed on the PC 36 side.

When an "automatic filing command" is selected from the menu on the monitor screen of the PC 36 by double-clicking an input operation mouse (not shown), the PC 36 starts the automatic filing processing from the following step S300 (step S300).

First, after transmitting a "cartridge information transfer command" to the film scanner 600 side, the PC 36 receives film cartridge information from the film scanner 600 and ensures a required memory area space in consideration of the capture frame count designation value and the film frame count in the cartridge (step S301).

Subsequently, the PC 36 checks whether the required memory area space is ensured (step S302).

If the required space cannot be ensured, the PC 36 outputs and displays a predetermined "memory shortage warning display" on the monitor screen of the PC 36 (step S303), and this processing routine is ended to return to the former processing (step S304).

On the other hand, if the required memory area space is ensured, the PC 36 transmits the capture frame number and a "frame feed command" to the scanner side to set the scanner so as to read the designated frame, and at the same time to cause the scanner to read the magnetic information corresponding to the target frame from the magnetic track 47 of the film F (step S305).

Next, the PC 36 receives the magnetic information about the frame of the film F from the film scanner 600 side (step S306).

This frame information includes the aspect information (e.g., "panorama", "high-vision", or "normal") of the film F used, and film frame information representing the photographing date, the presence/absence of the use of the electronic flash in a photographing operation, and the type of an external light source (e.g., a fluorescent lamp, a daylight lamp, or a tungsten lamp).

Subsequently, the PC 36 forms the preset values (i.e., a read resolution designation value, an automatic exposure selection switch, a capture image area designation value, and the like) of image capture parameters on the basis of various types of frame information described above and the setting values (i.e., a read resolution designation value, a resolution fixing/non-fixing selection switch, an automatic exposure selection switch, a capture image area designation value, and the like) of the automatic filing control panel (step S307).

The PC 36 transmits the image capture command and the preset values of the image capture parameters to the film scanner 600 side (step S308).

The PC 36 detects whether the film scanner 600 can perform image capture, and if YES, outputs a so-called "transmission enable signal" to the film scanner 600 side to capture one-line image data from the film scanner 600 in accordance with a predetermined "handshake" defined between the PC 36 and the film scanner 600, and to display this image data on the monitor (step S309).

That is, the PC 36 outputs and displays the image data captured from the film scanner 600 side to and on thumbnail display windows, as shown in FIGS. 8A to 8D, on the monitor of the PC 36 in units of lines.

With such display, the "impatient" feeling of the user due to the waiting time during the execution of automatic filing can be released, and the systematic image filing system having good operability can be provided.

Note that the case wherein the image data are displayed in units of lines has been exemplified. However, the image data may be displayed in units of several lines as far as the above object is attained.

Next, the PC 36 performs systematic filing processing (to be described later) with respect to a predetermined internal or external storage device existing in the PC 36 side on the basis of the image data and the film information which are sent from the scanner (step S310).

The PC 36 checks whether the image data is the final data of the frame subjected to processing (step S311), and if YES, advances to processing in step S312.

If NO, the PC 36 returns to the processing in step S309 and repeats similar processing as described above (step S311).

In step S312, the PC 36 checks whether the filing processing is ended (step S312).

If the filing processing is ended, the PC 36 returns to a predetermined control routine (not shown; step S313).

In contrast, if the filing processing is not ended yet, the PC 36 returns to the above processing in step S305 and repeats a similar series of processing steps.

Figure 7B:
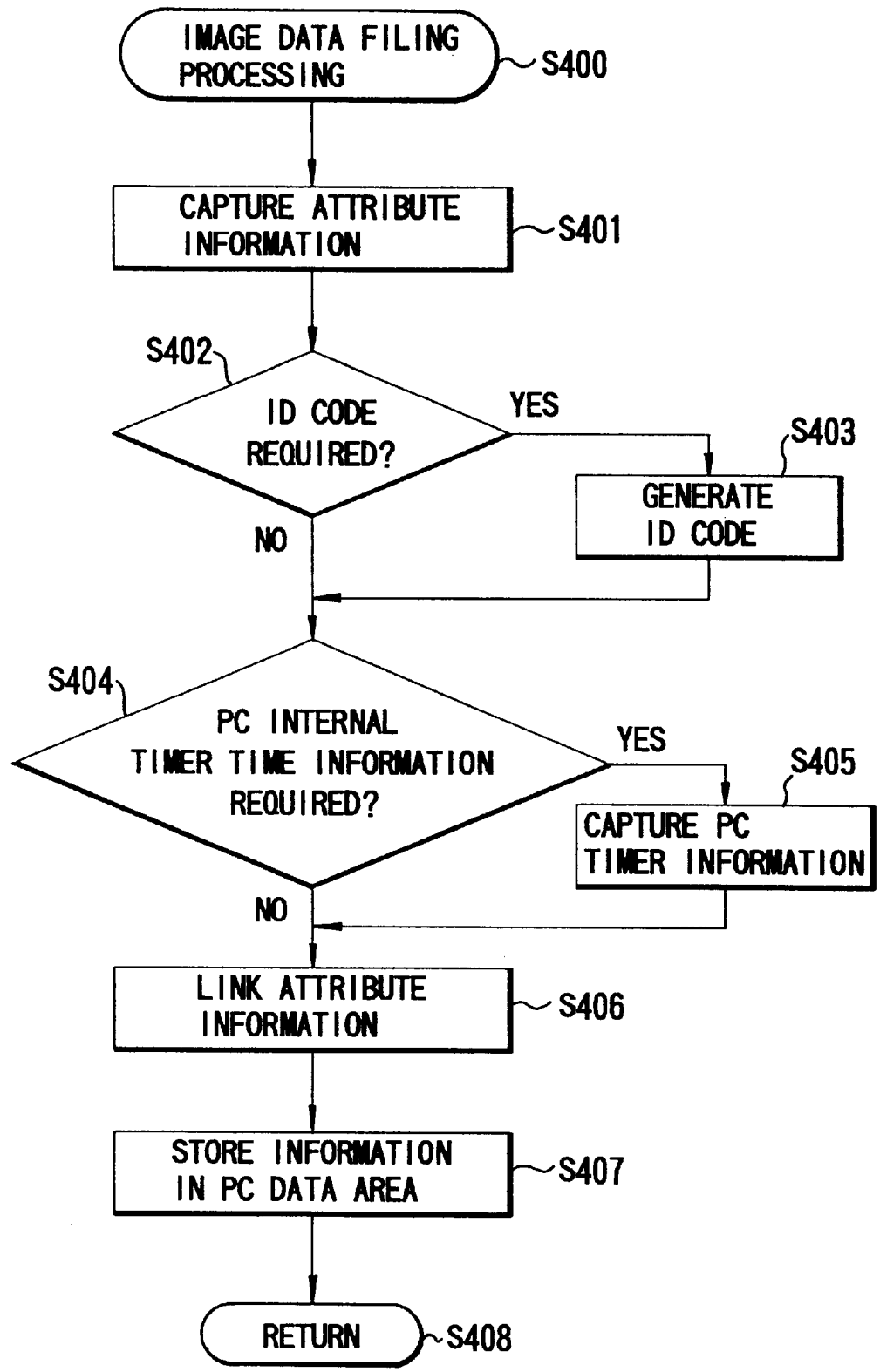
Figure 8A:
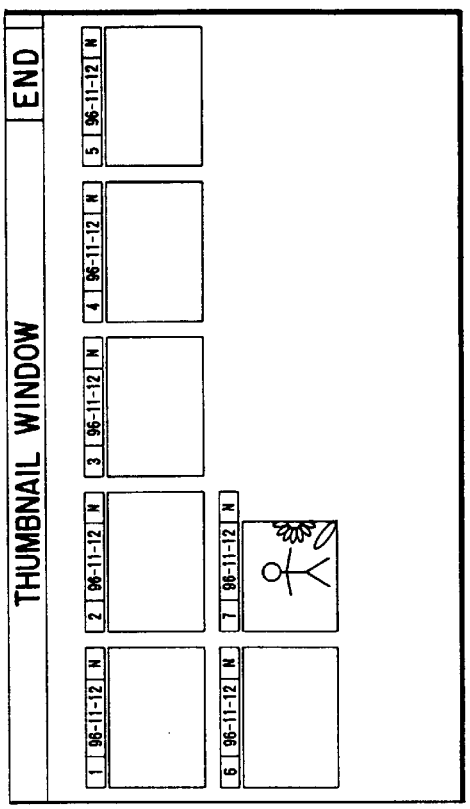
FIGS. 8A, 8B, 8C, and 8D are explanatory views showing the display operation of a thumbnail display window in the image filing system according to the second embodiment of the present invention.
Figure 8B:
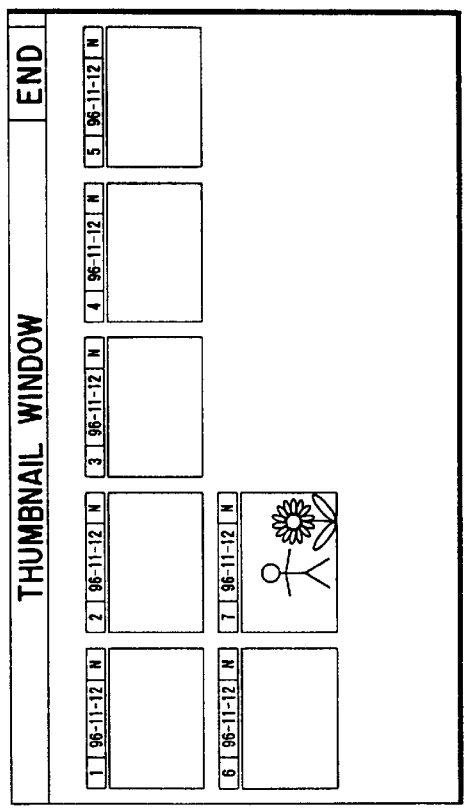
Figure 8C:
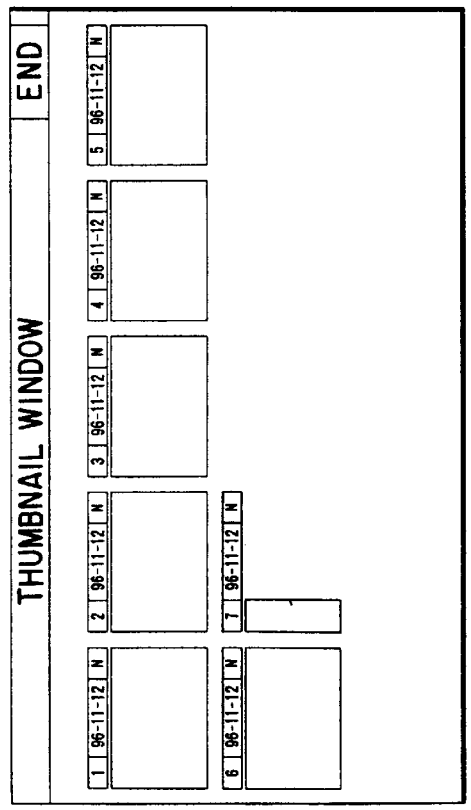
Figure 8D:
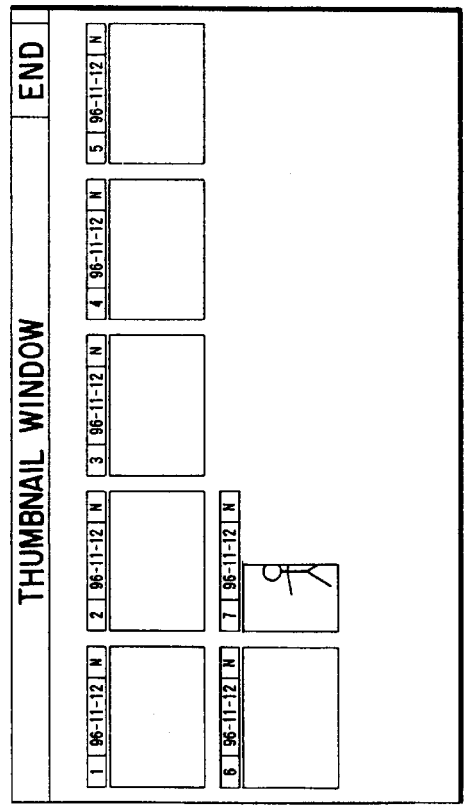

FIG. 7B is a flow chart showing a detailed processing procedure of the filing processing in step S310 of FIG. 7A.

First, in step S401, the PC 36 receives attribute information to be applied to the image data on the basis of a keyboard input of the operator.

The attribute information to be applied to the image data includes the photographing date and time information, the film frame number information, the cartridge identifier (random ID code) as random code information, the cartridge number, the data capture time information on the PC 36, and the like, as described above.

In step S402, the PC 36 checks whether the random ID code is selected as the attribute information to be applied to the image data.

If YES in step S402, the PC 36 advances to processing in step S403, and if NO, it advances to step S404.

In step S403, the PC 36 generates a cartridge identifier ID (random ID code) as the random code information.

In step S404, the PC 36 checks whether the data capture time information on the PC 36 is selected as the attribute information to be applied to the image data.

If YES in step S404, the PC 36 advances to processing in step S405, and if NO, it advances to step S406.

In step S405, the PC 36 receives the internal timer information of the PC 36 as the data capture time information on the PC 36.

Since this case is based on the assumption that the random ID code is selected in step S402 or the data capture time information on the PC 36 is selected in step S405, at least either information is selected in the two steps.

In step S406, the PC 36 links the attribute information selected as described above and the image data. In step S407, the resultant data is stored in a predetermined memory area of the PC 36.

Then, in step S408, the PC 36 returns to the former processing routine.

Figures 9, 10:
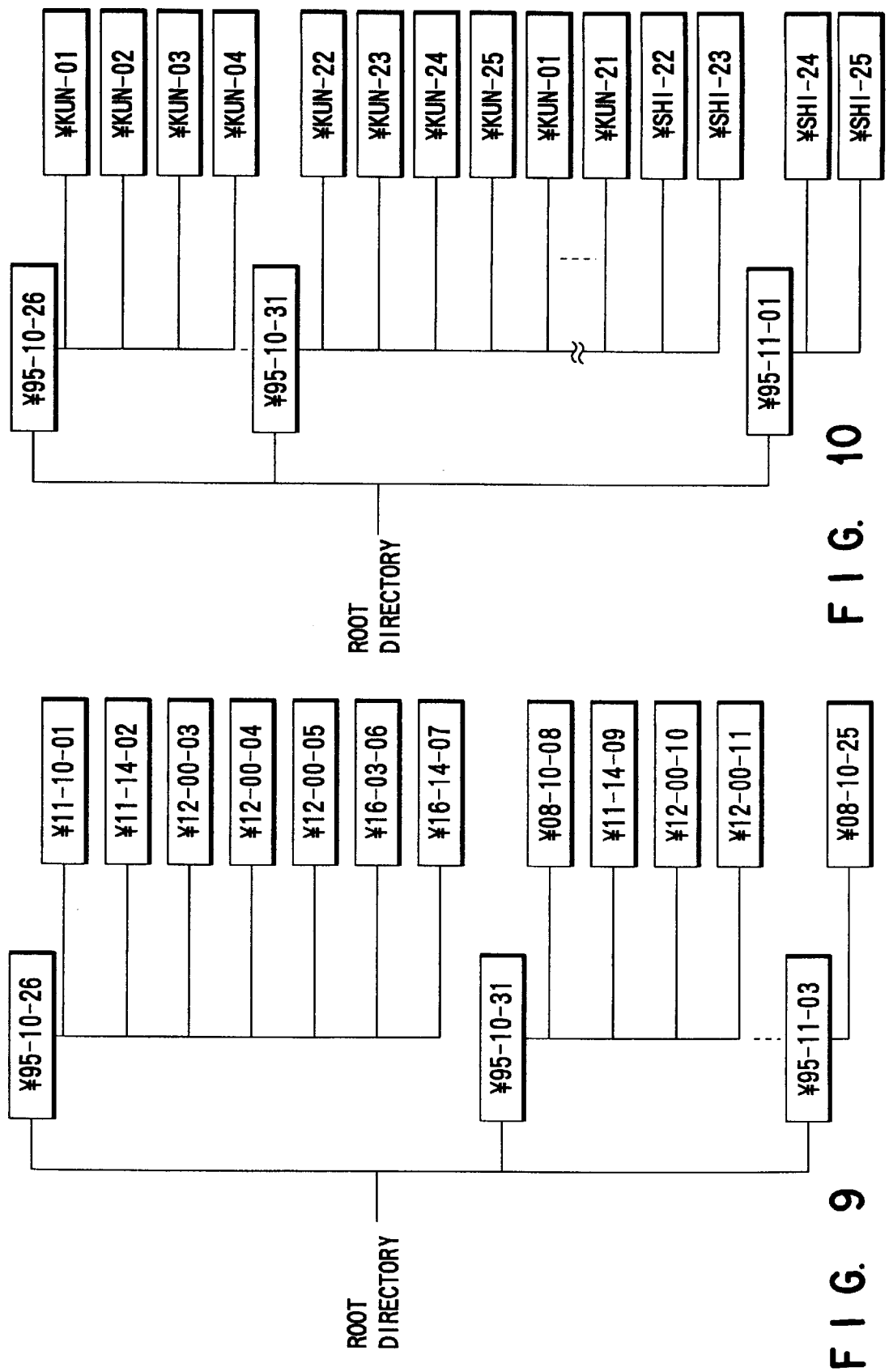
FIG. 9 is a view showing the directory structure of the first example of captured image data filing by the image filing system of the present invention.
FIG. 10 is a view showing the directory structure of the second example of the captured image data filing by the image filing system of the present invention.

FIG. 9 shows the data structure of an example of filed image data captured, stored, and accumulated in the recording means by the image filing system of the present invention.

That is, FIG. 9 represents how the captured image data are filed in the above-mentioned processing in step S301 and steps S401 to S408 of FIGS. 7A and 7B.

More specifically, one example shown in FIG. 9 is the first example in which photographing dates (¥95-10-26, ¥95-10-31, . . . , ¥95-11-03) are defined as directory names which belong to the root directory, photographing times (¥11-10-01, ¥11-14-02, . . . , ¥08-10-25) are defined as file names, and respective corresponding film image data are filed.

Such classification into the directory and file names is due to limitations on the number of name characters to eight characters in half size, like in a predetermined operating system (OS; e.g., DOS).

When the number of characters is limited to 256 in half size, like in a predetermined OS having a window function, the photographing date and time are filed as a file name on the root directory, as a matter of course.

In the above image filing system, since the film information is automatically added by the camera used in a photographing operation. By properly utilizing this added information, data can be automatically filed in a systematic manner without bothering the user. Further, since film information is given a name closely related to the filed image information, this image filing system is very preferable for a man-machine interface between the user and the system.

By filing data in this manner, the user can easily estimate the contents of a file only by checking its file name among an enormous amount of capture image information. In addition, no special so-called "file viewer" and the like are required, and desired image data can be retrieved based on only the file name.

According to this embodiment, therefore, the image filing system having good usability and good operability can be provided.

(Modifications)

The file name shown in FIG. 9 is constituted by the time information and the frame number. However, since a user, who does not perform a photographing operation such as continuous photography and snapshot, will not take a plurality of pictures per minute, the file name constituted by only the "time" is sufficiently practical in a normal case.

If continuous photography is performed, however, files having the same file name may be formed only with the time information, and the image data may be overwritten with new image data. Therefore, in this modification, such a disadvantage is eliminated by constituting the file name with the time information including the second, and the frame number information.

The present invention may be properly modified in accordance with the use form.

Similarly, FIG. 10 shows the second modification of the captured image data filing according to the image filing system of the present invention.

In this modification, overwriting of image data is prevented by producing a predetermined "identifier" at the start of automatic filing processing of the film and adding the identifier to produce a unique file name.

In this system, although the identifier may be generated for each captured image data, the identifier described in this modification is formed of three predetermined letters (e.g., KUN and SHI) and a film frame number in the above-mentioned "capture parameter preset value forming processing" in step S307 of FIG. 7A. When the presence of files having the same file name is detected in the same directory (¥95-10-26, ¥95-10-31, or ¥95-11-01), the above identifier is changed to another identifier.

By performing filing processing in this manner, the system in which the number of types of identifiers which are meaningful but not significantly related to each image data is prevented from increasing can be realized. The image filing system having good usability in terms of file management can be provided.

Figure 11:
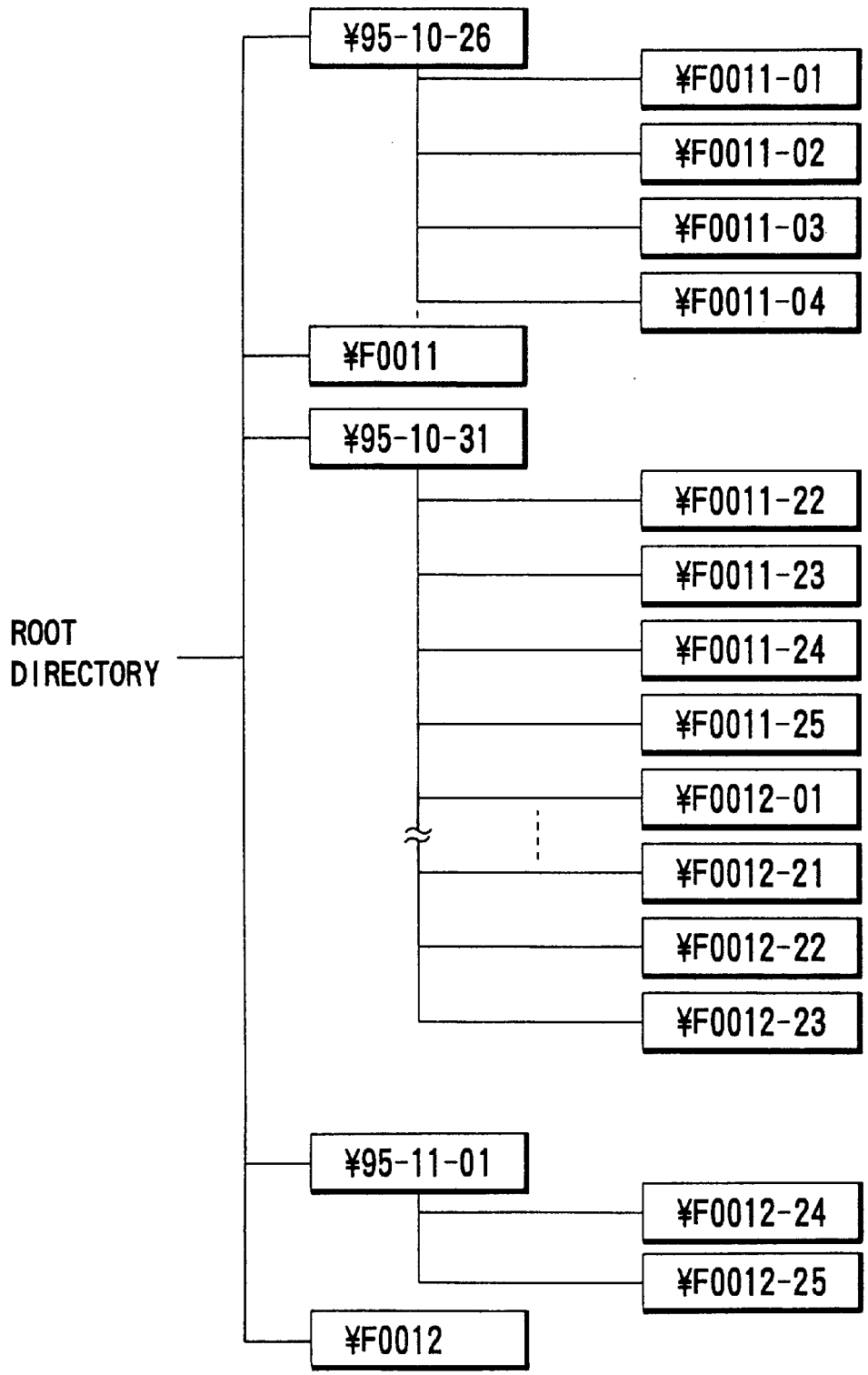
FIG. 11 is a view showing the directory structure of the third example of the captured image data filing by the image filing system of the present invention.

FIG. 11 shows the third modification of the captured image data filing according to the image filing system of the present invention.

More specifically, in this modification, overwriting of image data is prevented by producing a film cartridge number as the above identifier, adding the identifier to a certain file, and generating a unique file name.

In this modification, the identifier is constituted by one letter (F) and a film cartridge number formed of four digits (0011, 0012). This identifier is changed to another identifier for each film cartridge.

This identifier is written in a portion near the film tongue portion in "film rewind processing" (not shown) which is performed upon completion of the processing in FIG. 7A.

With this processing, the image filing system having good usability because of the file name corresponding to the film cartridge can be provided.

Similarly, the modification shown in FIG. 11 utilizes the film cartridge number as a file name. The "thumbnail display window" output and displayed on the monitor screen of the PC 36 side in the above processing step of "memory shortage display on PC monitor" as step S303 in FIG. 7A is also automatically output and displayed upon completion of the processing routine in FIG. 7A. Therefore, the information about the film cartridge and the information about the memory can be immediately confirmed.

According to this modification, the file formation system having good usability can be provided for an automatic thumbnail display screen.

FIG. 12 shows the fourth modification of the captured image data filing according to the image filing system of the present invention.

More specifically, in this modification, overwriting of image data due to generation of files having the same file name can be prevented by utilizing the capture time information (e.g., 16:20'01 to 18;11'25) of the PC as the identifier for the above-mentioned object.

FIG. 13 shows the fifth modification of the captured image data filing according to the image filing system of the present invention.

More specifically, in this modification, this system automatically utilizes the capture time information on the PC 36 side when no film information is recorded.

Since the photographing time information and the image capture time information are normally changed in units of months, if no film information is obtained, the capture time information (e.g., 11:10'01 to 08:10'25) on the PC 36 side can be sufficiently used to realize the object of the present invention.

In this case, it is set that the photographing time information and the capture time information on the PC 36 side are distinguished from each other using a hyphen (-) and a slant (/). For example, time information hh:mm'nn is automatically converted into a file name ¥hh/mm/nn, and the obtained file name is used.

That is, in this modification, the file name is improved to reduce the disorder of file names even when a large number of files mixedly exist.

(Another Modification)

Note that the operating system (OS) for system control in the image filing system of the present invention is not limited to a specific OS and can use such an OS which provides an environment having a predetermined window function and a database function.

Moreover, the present invention can be modified without departing from the spirit and scope of the present invention.

A plurality of embodiments have been described above. This specification incorporates the following inventions.

(1) There is provided an image filing system characterized by comprising:
- an image capture means for capturing an image of a photographic film having developed;
- an information reading means for reading photographing information recorded on the film in a photographing operation; and
- an image data accumulation means for adding the read photographing information, as attribute information, to the captured film image and then accumulating the image.

(2) The image filing system defined in (1) is characterized in that the photographing information recorded in the photographing operation is photographing date information or photographing time information.

(3) The image filing system defined in (1) is characterized in that the photographing information recorded in the photographing operation includes at least film cartridge information and film frame count information.

(4) There is provided an image filing system characterized by comprising:
- an image data capture means for capturing image data of a film;
- an information detection means for detecting photographing date information recorded on the film; and
- an accumulation means for adding the detected photographing date information, as attribute information, to the captured image data and then accumulating the data.

(5) There is provided an image filing system characterized by comprising:
- an image data capture means for capturing image data of a film;
- an information detection means for detecting photographing date information and photographing time information which are recorded on the film; and
- an accumulation means for adding the detected photographing date information as first attribute information and the photographing time information as second attribute information to the captured image data and then accumulating the data.

(6) There is provided an image filing system characterized by comprising:
- an image data capture means for capturing image data of a film;
- an information detection means for detecting photographing date information, photographing time information, and film frame count information which are recorded on the film; and
- an accumulation means for adding the detected photographing date information as first attribute information and the photographing time information and the film frame count information as second attribute information to the captured image data and then accumulating the data.

(7) There is provided an image filing system characterized by comprising:
- an image data capture means for capturing image data of a film;
- an information detection means for detecting photographing date information, photographing time information, and film frame count information which are recorded on the film;
- a film cartridge identification information generation means for generating predetermined film cartridge identification information; and
- an accumulation means for adding the detected photographing date information, the film cartridge identification information, and the film frame count information as attribute information to the captured image data and then accumulating the data.

(8) There is provided an image filing system characterized by comprising:
- an image data capture means for capturing image data of a film;
- an information detection means for detecting photographing date information and film frame count information which are recorded on the film;
- a randomized identification information generation means for generating predetermined randomized identification information; and
- an accumulation means for adding the detected photographing date information, the randomized identification information, and the film frame count information as attribute information to the captured image data and then accumulating the data.

(9) There is provided an image filing system characterized by comprising:
- a film image data capture means;
- a film information detection means for detecting photographing date information of a film; and
- a storage/accumulation means for storing and accumulating the captured film image data, wherein the storage/accumulation means uses the photographing date as a directory name and stores and accumulates the captured image information in correspondence with the directory name.

(10) There is provided an image filing system characterized by comprising:

a film image data capture means;

a film information detection means for detecting photographing date and time information of a film; and a storage/accumulation means for storing and accumulating the captured image data, wherein the storage/accumulation means uses the photographing date as a directory name and the photographing time as a file name, and stores and accumulates the captured image data in correspondence with the directory name and the file name.

(11) There is provided an image filing system characterized by comprising:

a film image data capture means;

a film information detection means for detecting photographing date and time information of a film; and a storage/accumulation means for storing and accumulating the captured film image data, wherein the storage/accumulation means uses the photographing date as a directory name and both the photographing time and a film frame number as a file name, and stores and accumulates the captured image in correspondence with the directory name and the file name.

(12) There is provided an image filing system characterized by comprising:

a film image data capture means;

a film information detection means for detecting photographing date and time information of a film;

a storage/accumulation means for storing and accumulating the captured film image data; and a film cartridge identifier generation means for generating a predetermined cartridge identifier, wherein the storage/accumulation means stores and accumulates the captured image in correspondence with a file name constituted by the photographing date, the cartridge identifier, and a film frame number.

(13) There is provided an image filing system characterized by comprising:

a film image data capture means;

a film information detection means for detecting photographing date information of a film;

a storage/accumulation means for storing and accumulating the captured film image data; and a randomized identifier generation means for generating a predetermined random identifier, wherein the storage/accumulation means stores and accumulates the captured image in correspondence with a file name constituted by the photographing date, the identifier, and the film frame number.

(14) There is provided an image filing system characterized by comprising:

a film image data capture means;

a capture time information detection means for detecting captured date and time information of image data of a film;

a storage/accumulation means for storing and accumulating the captured film image data; and a randomized identifier generation means for generating a predetermined random identifier, wherein the storage/accumulation means stores and accumulates the captured image in correspondence with a file name constituted by at least the capture time information.

As has been described above, the image filing system of the present invention can provide the following effects.

That is, for example, the filing processing can be automatized by filing captured image data in correspondence with the directory name and the file name based on film frame information such as the photographing date and time. In addition, since the file name is significantly related to the image data contents, the user easily retrieves desired image data with good usability.

Since no special file viewer is required in retrieving the image data, and the contents of the image can be estimated from its name, the image can be detected and selected at a high speed with good usability.

Further, since the number of desired images and that of desired files can be easily limited with the file manager of a processing unit, e.g., that of a normal PC, the filing system is not influenced by the type of an OS or the environment, is hardly limited in practical use, and has good usability.

In a data file structure stored and accumulated by the image filing system of the present invention, for example, image data can be accessed using the photographing time stamp value as a sort key. The image filing system which can automatically generate file management information in consideration of a man-machine interface convenient for the user can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An electronic image file apparatus comprising:

an image data capture unit for capturing image data recorded on a film;

a film information detector for detecting photographing date information, photographing time information, and a film frame number of said film; and a storage/accumulation unit for storing and accumulating the image data captured by said image data capture unit, wherein said storage/accumulation unit uses the photographing date information detected by said film information detector as a directory name and both the photographing time information and the film frame number detected by said film information detector as a file name, and stores and accumulates the image data captured by said image data capture unit in correspondence with the directory name and the file name.

2. An electronic image file apparatus comprising:

an image data capture unit for capturing image data recorded on a film;

a film information detector for detecting photographing date information and a film frame number of said film;

a storage/accumulation unit for storing and accumulating the film image data captured by said image data capture unit; and a film cartridge identifier generation unit for generating a predetermined cartridge identifier relating to a film cartridge for storing said film, wherein said storage/accumulation unit stores and accumulates the film image data captured by said image data capture unit in correspondence with a file name which is set in accordance with the photographing date information and the film frame number detected by said film information detector and the cartridge identifier generated by said film cartridge identifier generation unit.

3. An electronic image file apparatus comprising:

an image data capture unit for capturing image data recorded on a film;

a film information detector for detecting photographing date information and a film frame number of said film;

a storage/accumulation unit for storing and accumulating the film image data captured by said image data capture unit; and a randomized identifier generator for generating a predetermined random identifier, wherein said storage/accumulation unit stores and accumulates the film image data captured by said image data capture unit in correspondence with a file name which is set in accordance with the photographing date information and the film frame number detected by said film information detector and the predetermined random identifier generated by said randomized identifier generator.

* * * * *